United States Patent [19] [11] 4,344,083
Srivastava [45] Aug. 10, 1982

[54] VIR GAIN AND PHASE CORRECTION NETWORK

[75] Inventor: Gopal K. Srivastava, Buffalo Grove, Ill.

[73] Assignee: Zenith Radio Corporation, Glenview, Ill.

[21] Appl. No.: 219,104

[22] Filed: Dec. 22, 1980

[51] Int. Cl.³ ............................................. H04N 9/535
[52] U.S. Cl. .................................................. 358/21 V
[58] Field of Search ...................... 358/21 R, 21 V, 27, 358/28, 40

[56] References Cited
U.S. PATENT DOCUMENTS 4,215,363  7/1980  Borlaug ............................ 358/21 V
4,305,089 12/1981  Hosoya ............................. 358/21 V
4,306,247 12/1981  Tomimoto ........................ 358/21 V Primary Examiner—Michael A. Masinick

[57] ABSTRACT

A network is described for use in a VIR (Vertical Interval Reference) correction system to correct the phase and amplitude, respectively, of the color bursts and chrominance associated with a color television signal. The network includes a phase shifting network receiving the uncorrected color signal for developing a phase-shifted color signal. The uncorrected color signal, the phase-shifted color signal, and a phase-error signal are applied to a phase control circuit which develops color burst outputs which are in phase with the color bursts in the uncorrected color signal when no phase correction is required. When the phase error signal indicates that correction is required, the phase of its color burst output is varied over a range between the phases of the uncorrected color signal and the phase-shifted color signal. To process the chrominance portion of the color signal, a gain control circuit receives the uncorrected color signal and adjusts its amplitude in response to an amplitude error signal. The phase-corrected bursts are combined with the amplitude-corrected chrominance to provide a composite corrected color signal.

6 Claims, 5 Drawing Figures

VIR GAIN AND PHASE CORRECTION NETWORK

BACKGROUND OF THE INVENTION

This invention is generally directed to systems which correct the phase and amplitude of the color components of television signals. It is particularly directed to systems such as television receivers which employ a VIR (Vertical Interval Reference) signal to effect such correction.

Many television stations broadcast a VIR signal on the nineteenth line of each television field. That signal is processed in some television receivers for use in correcting the phase of the color bursts and the amplitude of the chrominance which are transmitted during the receiver's scan time.

An important aspect of such correction systems is that they apply phase or amplitude adjustment only when needed. That is, color signals which do not require adjustment should be unmodified by the correction system so that the reproduced television image has correct saturation and hue.

The design criteria set forth above may be particularly difficult to achieve in a type of correction system referred to herein as a "feed through" system. In this type of system, the color signal is applied to a phase and amplitude correction network which is instructed either to feed the color signal directly through to further color processing circuitry without modification, or to modify the color signal when other circuitry senses the presence of phase or amplitude errors. Because the phase and amplitude correction network always handles the color signal, even when correction is not required, it is difficult to avoid introducing unwanted phase, amplitude and/or bandwidth distortions. The present invention provides a phase and amplitude correction network which avoids this problem and makes VIR correction a feature which is more easily incorporated in a television system.

OBJECTS OF THE INVENTION

It is a general object of the invention to provide an improved phase and amplitude correction network for use in a VIR correction system.

It is a more specific object of the invention to provide such a network which, when used in a "feed through" environment, modifies the phase and/or amplitude of a color signal only when correction is required.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figure 1:
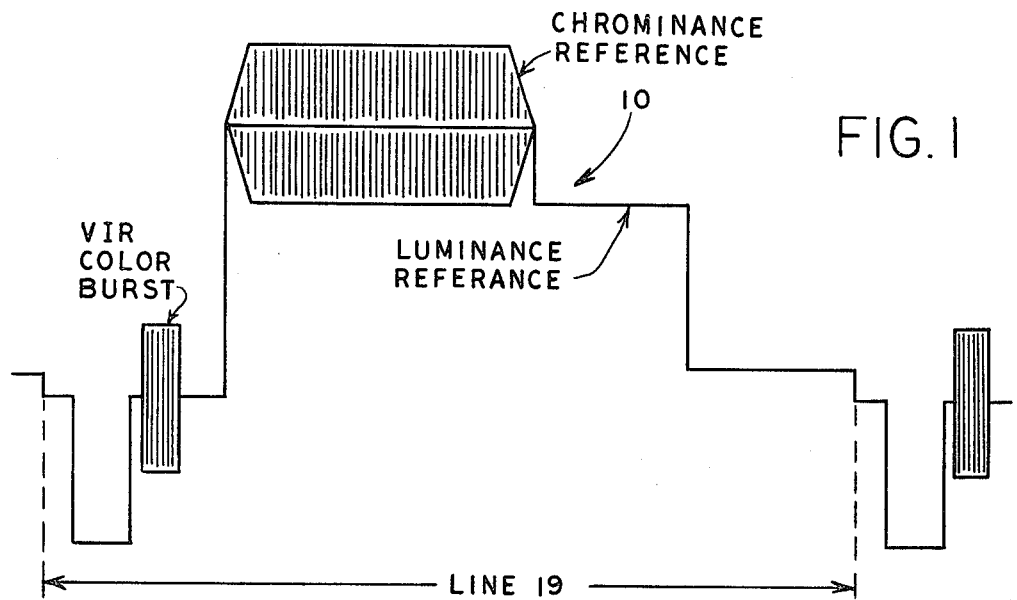
FIG. 1 illustrates a standard VIR signal of the type included on the nineteenth line of each television field.

Before describing the invention, a brief description of a conventional VIR signal will be given so that the terminology used hereinafter may be more readily understood. Referring to FIG. 1, a VIR signal 10 is shown of the type commonly transmitted on the nineteenth line of each television field. The illustrated line includes a VIR color burst of about 3.58 megahertz followed by a VIR chrominance reference of the same frequency. Usually, the VIR color burst is of the same phase and frequency as the standard color bursts which are transmitted during scan time. In addition, the amplitude of the VIR color burst is of the same amplitude as the chrominance reference. A luminance reference is also transmitted immediately following the chrominance reference.

Figure 2:
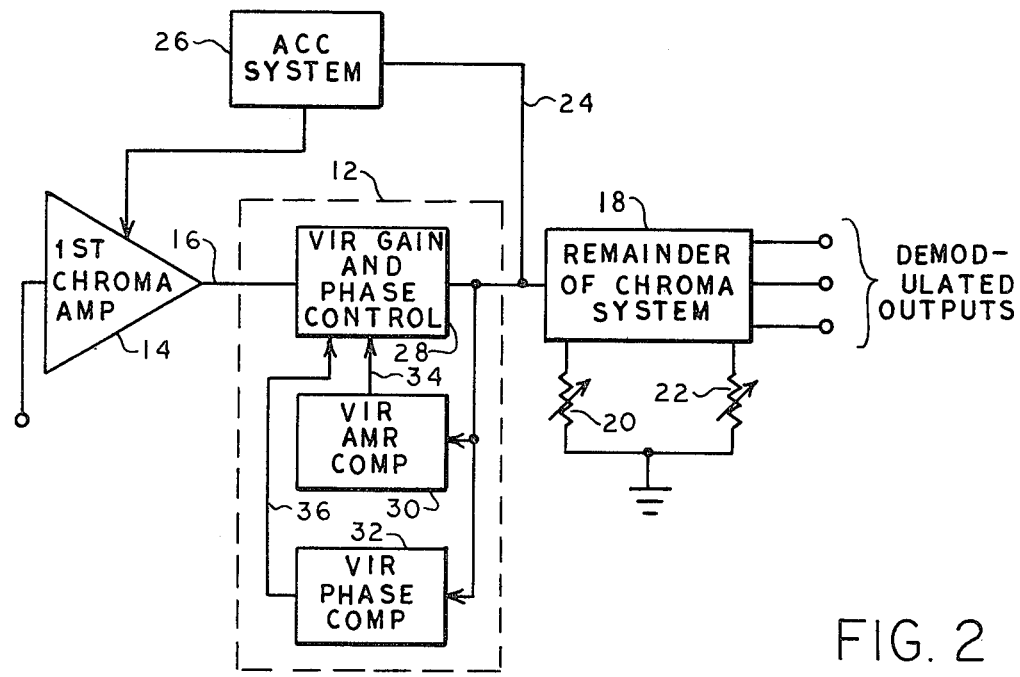
FIG. 2 shows a block diagram of a VIR correction system which includes a VIR gain and phase control network according to the invention; also shown is the way in which the correction system may interface with color processing circuitry in a television receiver.

Referring now to FIG. 2, a VIR correction system 12 is shown of the type with which the invention is preferably used. The input to the correction system 12 may be from a first chroma (chrominance) amplifier 14 of the type conventionally used in color television receivers. The input to the amplifier 14 is typically a video signal which includes the VIR signal on line 19 and the standard color bursts and chrominance information which are transmitted during the receiver's scan time. The chrominance information transmitted during scan time, i.e., the chrominance portion of the video signal, is referred to herein as "video chrominance" to distinguish it from the VIR chrominance reference. The video input to the amplifier 14 may also include luminance information which is removed by filters in the amplifier 14. Hence, the output of the amplifier 14 is an amplified color signal which includes video chrominance, standard color bursts, and the 3.58 megahertz components of the VIR signal.

The color signal is coupled via a lead 16 to the VIR correction system 12. If no phase or amplitude correction is needed for the color signal, it is fed directly through the correction system 12 to the remainder of the chroma system, the latter being identified as the box 18. The box 18 may include a second chroma amplifier, demodulators for developing demodulated color outputs, and circuitry responsive to a tint control 20 and a color level control 22 by which a viewer may adjust the tint and saturation of the reproduced color image.

The output of the correction system 12 is also coupled via a lead 24 to a conventional ACC (automatic color level control) system 26. The ACC system 26 senses the amplitude of the color bursts on the lead 24 and modifies the gain of the amplifier 14 to hold substantially constant the amplitude of the color signal on the lead 16.

Referring more specifically to the correction system 12, it includes a VIR gain and phase control 28, a VIR amplitude comparator 30 and a VIR phase comparator 32. The amplitude comparator 30, the phase comparator 32, and the illustrated color processing system which interfaces with the correction system 12 are disclosed more fully in U.S. Application Ser. No. 231,635 filed Feb. 4, 1981. Suffice it to say that the amplitude comparator 30 senses the output of the control 28 to compare the amplitude of the VIR color burst to the amplitude of the VIR chrominance reference. If an amplitude difference is detected, the comparator 30 applies an amplitude error signal to the control 28 via a lead 34. In response, the control 28 modifies the amplitude of the VIR chrominance reference and the amplitude of the video chrominance.

The phase comparator 32 senses the output of the control 28 to compare the phase of the VIR color burst to the phase of the VIR chrominance reference. If a phase difference is detected, the comparator 32 applies a phase error signal to the control 28 via a lead 36. In response, the control 28 modifies the phase of the VIR color burst and the standard color bursts. Of course, when no error signals are present on the leads 34 and 36, the gain and phase control 28 should output to the box 18 the very same signal, in unmodified form, which it receives from the first chroma amplifier. No substantial modifications to the phase, amplitude, or bandwidth of the color signal on lead 16 should occur. The present invention provides such a gain and phase control.

Figure 3:
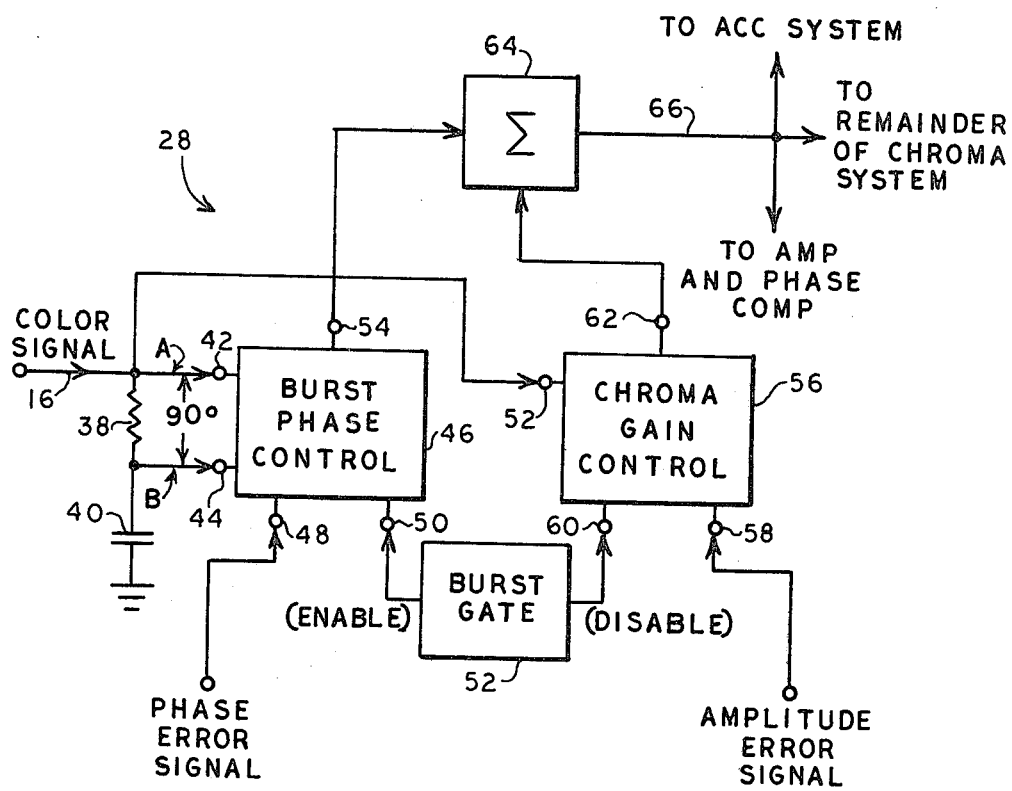
FIG. 3 is a more detailed block diagram of the gain and phase control network shown in FIG. 2.
Figure 4:
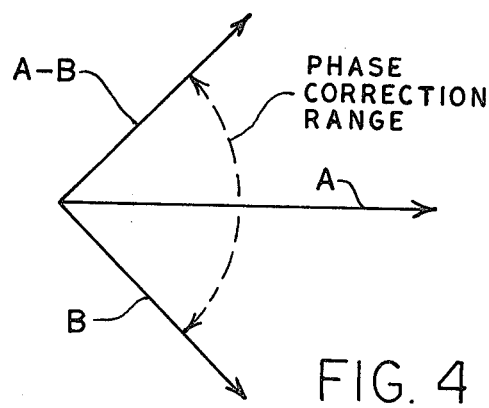
FIG. 4 is a vector diagram useful in explaining the operation of the gain and phase control network.

Referring now to FIG. 3, a block diagram of the present VIR gain and phase control 28 is shown. The input to the control 28 is the color signal on the lead 16. Coupled to the lead 16 is a phase shifting network comprising a resistor 38 and a grounded capacitor 40. For purposes of explanation, the phase of the color signal on the lead 16 is assumed to be as indicated by a vector A in FIG. 4. The function of the phase shifting network is to develop a phase-shifted color signal at vector angle B (FIG. 4) across the capacitor 40. This is preferably effected by choosing the resistor 38 and the capacitor 40 such that a phase shift of forty-five degrees occurs across the capacitor 40 at a frequency of 3.58 megahertz. With this type of RC network, the signal across the resistor 38 (vector A-B) is 90 degrees leading with respect to the signal across the capacitor 40. Therefore, the signal across the resistor 38 leads the signal on the lead 16 by 45 degrees.

The color signals at vector angles A and B are applied to first and second input ports 42 and 44, of a burst phase control 46. A third input port 48 receives the phase error signal developed by the phase comparator 32 (FIG. 2) and a fourth input port 50 receives an enabling gate signal from a burst gate 52 to enable the phase control 46 only during the VIR and standard color burst portions of the color signal. The phase control 46 responds to the state of the phase error signal by combining the color burst portions of the color signals at vector angles B and A-B so as to provide, at an output port 54, an uncorrected color burst output at vector angle A when the phase error signal indicates that no phase correction is desired. When phase correction is indicated as being necessary, the phase control 46 provides, at port 54, a corrected color burst output whose phase differs from the vector angle A. Preferably, the phase control 46 provides a corrected color burst output whose phase is variable over a range between vector angle B and vector angle A-B (see FIG. 4). Thus, the phase control 46 always operates on the color signals identified by vectors B and A-B but, when no correction is desired, a signal corresponding to vector A appears at the port 54. When correction is desired, vectors B and A-B are combined in variable proportions to develop a phase correction range of about ninety degrees. Because the phase control 46 is enabled only during color burst intervals, neither the VIR chrominance reference nor the video chrominance, both of which are present on lead 16, are output at the port 54.

Also included is a chroma gain control 56. This control receives the input color signal (vector A) at a port 57, the amplitude error signal from the amplitude comparator 30 at a port 58, and a burst interval disabling signal at another port 60. The latter signal disables the control 56 during VIR color burst and standard color burst portions of the color signal. Therefore, the control 56 operates only on the VIR chrominance reference and video chrominance to develop amplitude corrected chrominance at an output port 62 in response to the amplitude error signal. When the amplitude error signal indicates that no correction is required, the gain control 56 outputs an unmodified chrominance signal at vector angle A. Even when amplitude correction takes place, the phase of the chrominance at port 62 remains the same as the phase of the chrominance on lead 16. Thus, phase corrected color bursts are present at the output port 54, and amplitude corrected chrominance is present at the output port 62. The signals at both output ports are combined in a summer 64 to provide a composite (burst plus chrominance) corrected color signal at an output lead 66.

Figure 5:
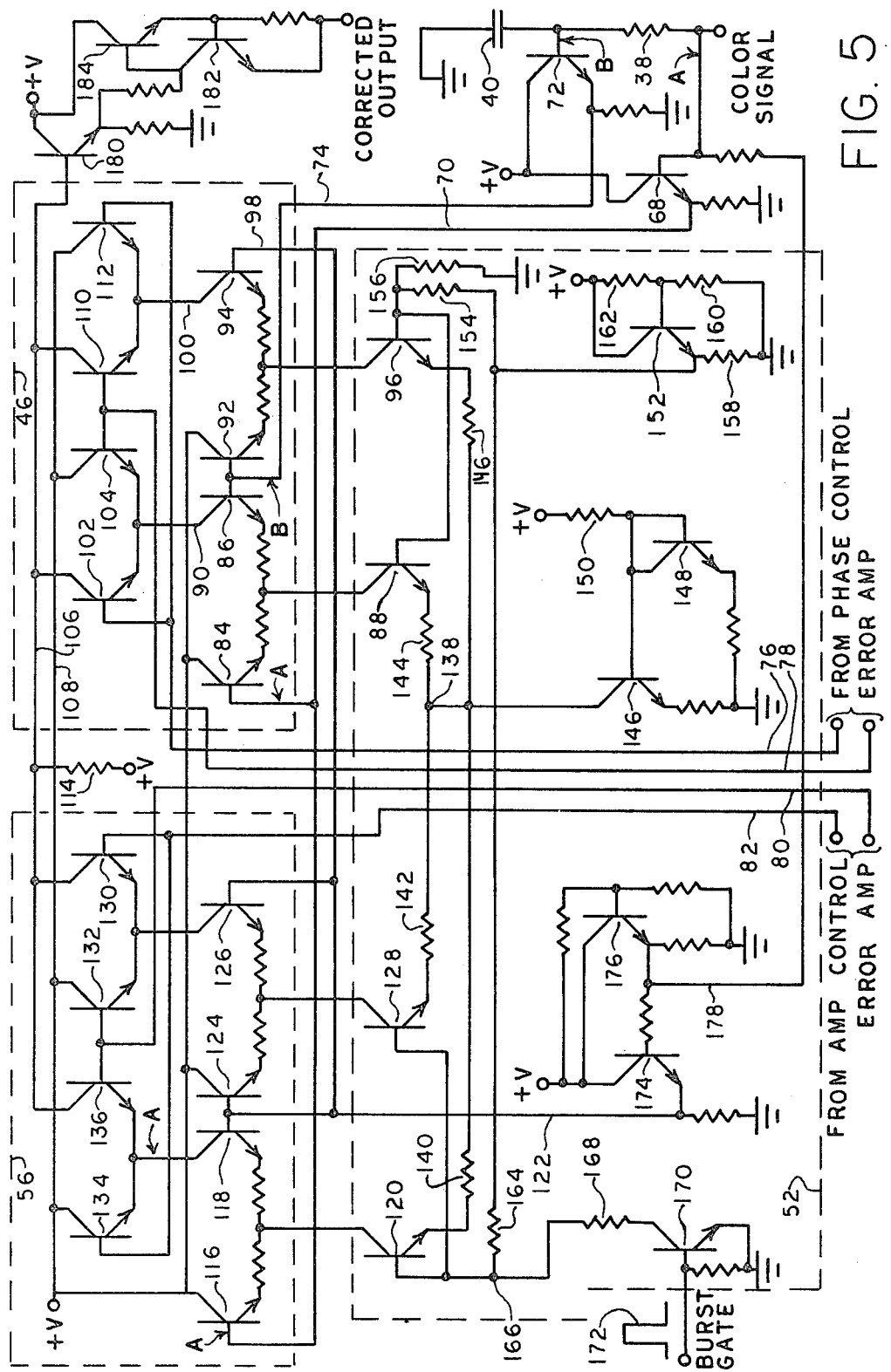
FIG. 5 is a schematic diagram of a preferred form of the gain and phase control network shown in FIG. 3.

Referring now to FIG. 5, a detailed circuit diagram is shown of a preferred embodiment of the burst phase control 46, the burst gate 52 and the chroma gain control 56. The function of the summer 64 is provided by circuitry which is common to the controls 46 and 56.

The color input signal (vector A) is coupled to the gain control 56 and to the phase control 46 via a transistor 68 and a lead 70. The phase shifted color signal (vector B) is coupled to the phase control 46 via a transistor 72 and a lead 74.

In the illustrated embodiment, the phase control 46 and the gain control 56 include differential amplifiers which are responsive to differential error signals. Such error signals may be developed as described in the previously mentioned Application Ser. No. 231,635. A differential phase error is applied to the phase control 46 via leads 76 and 78, and a differential amplitude error signal is applied to the gain control 56 via leads 80 and 82.

Referring more specifically to the phase control 46, it includes a first differential amplifier comprising transistors 84 and 86 which receive operating current from another transistor 88. The base of the transistor 84 receives the color signal at vector angle A via the lead 70, and the base of the transistor 86 receives the phase shifted color signal at vector angle B via the lead 74. Hence, the collector lead 90 of the transistor 86 carries a signal current whose phase is defined by the vector angle A-B.

A second differential amplifier comprising transistors 92 and 94 receives operating current from a transistor 96. The base of the transistor 92 receives the phase shifted color signal at vector angle B while the base of the transistor 94 receives a D.C. bias via a lead 98. Hence, the collector lead 100 of the transistor 94 carries a signal current defined by the vector angle B. The remainder of the phase control 46 essentially operates to combine variable portions of the signal currents in collector leads 90 and 100 in response to the phase error signal.

To effect the combination of those signal currents, a current steering network is included which comprises another pair of differential amplifiers. One differential amplifier, formed from transistors 102 and 104, receives the signal current in the lead 90 and couples it without substantial phase shift to a lead 106. The collector current of the transistor 104 is unused and is coupled to a positive voltage source via a lead 108. The base of the transistor 104 receives half the differential phase error signal via the lead 78, and the base of the transistor 102 receives the other half of the phase error signal via the lead 76.

Another differential amplifier comprising transistors 110 and 112 receives the signal current carried by the lead 100 and couples it without substantial phase shift to the lead 106 through the transistor 110. The collector current of the transistor 112 is unused, wherefore, the collector of that transistor is coupled to the positive voltage supply by the lead 108.

The bases of transistors 110 and 112 are coupled to the leads 78 and 76, respectively, so as to alter their relative conduction levels in response to variations in the phase error signal.

In the manner described below, the transistors 88 and 96 are turned off except during color burst intervals so that the collectors of transistors 102 and 110 carry currents which are responsive only to color bursts received at the bases of transistors 68 and 72. The collectors of transistors 102 and 110 are coupled to a load resistor 114, across which phase-corrected color bursts are developed.

In operation, equal value signals on the leads 76 and 78 cause transistors 102 and 104 to be equally conductive. In this condition, transistors 110 and 112 are also equally conductive. This state is representative of zero phase error, and results in equal amplitude currents being coupled to the load 114 via transistors 102 and 110. Hence, the A-B component across the load 114 combines with the B component to provide a resultant signal whose phase is substantially equal to the phase of the vector A. Thus, the phase of the corrected burst signal across load 114 is the same as the phase of the signal input applied to the base of the transistor 68. When the signal on the lead 76 is sufficiently more positive than the signal on the lead 78, transistor 102 is fully conductive and transistor 110 is off. Consequently, the phase of the signal across load 114 is the same as the phase of the vector A-B.

When the signal on the lead 78 is sufficiently more positive than the signal on the lead 76, transistor 110 is fully conductive and transistor 102 is off. As a result, the signal developed across the load 114 has a phase equal to the phase of the vector B. It can be seen, therefore, that the phase control 46 combines color burst signals at vector angles A and B so as to develop a corrected color burst output whose phase is variable over a range between vector angle B and vector angle A-B.

Referring now to the gain control 56, it includes a differential amplifier comprising transistors 116 and 118 which receive operating current from another transistor 120. The base of the transistor 116 receives the color signal input at vector angle A via the lead 70, whereas the base of the transistor 118 receives a D.C. bias voltage via a lead 122. The collector of transistor 116 carries current which is fed to the positive voltage supply. The collector current of transistor 118 has an A.C. component of vector angle A and a D.C. component, both of which are applied to another current steering network.

The gain control 56 includes another differential amplifier comprising transistors 124 and 126 which receive operating current from another transistor 128. The bases of transistors 124 and 126 each receive but a D.C. bias voltage via the lead 122. With this arrangement, the collector current of transistor 126 has but a D.C. component which is equal to the value of the D.C. component of the collector current developed by the transistor 118.

To develop an amplitude-variable chrominance signal output, the collector of transistor 126 is coupled to the emitters of transistors 130 and 132 which form half of a current steering network. The other half of the current steering network comprises transistors 134 and 136, the emitters of which receive the collector current of transistor 118. Control over the current steering network is effected by coupling the bases of transistors 130 and 134 to the amplitude error signal on lead 82, and by coupling the bases of transistors 132 and 136 to the amplitude error signal on the lead 80. The collectors of transistors 132 and 134 are coupled to the positive supply voltage, and the collectors of transistors 130 and 136 are coupled to the load 114. With this arrangement, equal valued signals on leads 80 and 82 (no amplitude error) cause transistors 130 and 136 to conduct equally, thereby to develop a chrominance output across load 114 whose amplitude is equal to the amplitude of the chrominance input on lead 70.

When the signal on lead 80 is somewhat more positive than the signal on lead 82, the transistor 136 becomes more conductive and the transistor 130 becomes less conductive. Consequently, the chrominance output across load 114 increases in amplitude. Because the decrease in D.C. current carried by the transistor 130 is matched by a corresponding D.C. current increase in the transistor 136, the D.C. voltage across the load 114 remains unchanged.

When the signal on lead 82 is somewhat more positive than the signal on lead 80, the conduction of transistor 136 decreases and the conduction of transistor 130 increases, thereby lowering the amplitude of the chrominance signal developed across the load 114. The D.C. voltage across the load 114 remains unchanged, however.

As stated previously, the burst phase control 46 operates only on the VIR and standard color burst portions of the signals received at lead 70. Because the signal at that lead includes information other than color bursts, the control 46 is enabled, or gated on, by the burst gate 52 only during color burst intervals. At all other times, the burst gate 52 disables the phase control 46. The selective enabling and disabling of the control 46 is achieved in the following manner. The transistors 88 and 96, which supply operating current to the phase control 46, form one side of a differential amplifier, the other side of which is formed by transistors 120 and 128 in the burst gate 52. The latter transistors supply operating current to the gain control 56. To provide a common source of current for this differential amplifier, the transistors 120 and 128 are coupled to a node 138 via emitter resistors 140 and 142. Likewise, the transistors 88 and 96 are coupled to the node 138 by emitter resistors 144 and 146. Also coupled to the node 138 is the collector of a current source transistor 146 which is biased by a diode-connected transistor 148 and a resistor 150. The transistor 146 thus supplies a constant current at the node 138. As described below, the transistors 88 and 96 are turned on to receive all the operating current from the node 138 during VIR and standard color burst intervals, and the transistors 120 and 128 are turned on at all other times.

Selective turn on of the transistors 88 and 96 is achieved by altering the bias on those transistors relative to the bias on the transistors 120 and 128. For this purpose, the bases of the transistors 88 and 96 are coupled to a biasing network which includes a transistor 152 and resistors 154, 156, 158, 160 and 162. This biasing network may be selected to develop a voltage of about 5 volts at the emitter of transistor 152 and a voltage of about 4 volts at the bases of transistors 88 and 96. The voltage at the emitter of the transistor 152 is coupled via another resistor 164 to the bases of transistors 120 and 128. With this arrangement, transistors 120 and 128 are normally conductive and the transistors 88 and 96 are normally off. To turn the transistors 88 and 96 on, the junction between the resistor 164 and the base of the transistor 120 (node 166) is coupled via a resistor 168 to the collector of a gating transistor 170. The emitter of this transistor is grounded and its base receives a burst gate pulse 172 for turning the transistor 170 on during each color burst interval. Hence, when the pulse 172 occurs, the voltage at node 166 is pulled low, thereby turning off the transistors 120 and 128. The resistor 164 isolates the low level at node 166 from transistors 88 and 96, wherefore the latter transistors now become conductive for enabling the phase control 46. When the burst gate pulse 172 terminates, the voltage at node 166 rises again for enabling the transistors 120 and 128, thereby turning on the gain control 56 and turning off the phase control 46.

The burst gate 52 also includes a network for coupling a biasing voltage via the lead 122 to the base of transistor 94 in the phase control 46, and to the bases of transistors 124 and 126 in the gain control 56. This network includes a pair of transistors 174 and 176 and their associated biasing resistors. The emitter of the transistor 176 is coupled via a lead 178 to the base of the transistor 68 for biasing.

With the arrangement described above, the voltage developed across the load resistor 114 includes phase corrected VIR color bursts and standard color bursts (from the phase control 46), and amplitude corrected VIR chrominance reference signals and video chrominance (from the gain control 56). The corrected signal is coupled from the load resistor 114 to the box 18 (FIG. 2) and to the ACC system 26 via output transistors 180, 182 and 184.

One factor which is important about the characteristics of the corrected output signal is that the amplitude ratio of chrominance to color burst should remain substantially constant when the gain control 56 receives no differential amplitude error signal. This is partly achieved by insuring that the emitter degeneration resistors shown in the differential amplifiers of the control 56 are all of substantially equal value, and by insuring that the transistors in the control 56 are matched to one another. The same precaution is taken with respect to the emitter degeneration resistors and the matching of transistors in the phase control 46. Nevertheless, when a phase error signal is applied to the control 46, the phase corrected color burst developed across the load resistor 114 may experience a small change in amplitude. However, the illustrated system compensates for such a change, as best explained by the following example. Assuming that the amplitude of the color burst decreases at the output of transistor 182, that decrease will be sensed by the ACC system 26. As best illustrated in FIG. 2, the ACC system receives the output of the VIR correction system and controls the gain of the first chroma amplifier 14 to hold the amplitude of the color burst at a substantially constant level. Hence, any decrease in the amplitude of the color bursts at the output of the VIR correction system will be compensated by the ACC system increasing the gain of the first chroma amplifier 14. Thus, the color burst input to the VIR correction system will be brought back up to its original amplitude, but the amplitude of the VIR chrominance reference and the amplitude of the video chrominance will be increased due to the increased gain of the first chroma amplifier 14. However, an amplitude error signal is generated which causes the gain control 56 to adjust its gain so that the amplitude of the VIR chrominance reference and the video chrominance are brought back down to their previous level. Hence, the burst to chrominance amplitude ratio is maintained constant despite burst amplitude variations caused by the operation of the phase control 46.

It will be appreciated that the phase and amplitude correction network described above provide the kind of performance required in a "feed through" environment. When no correction is required, the color signal is unmodified and is processed as though the correction system were not present. Of course, the illustrated correction network may be used in non "feed through" applications as well. It may also be used as part of a VIR correction system in a television studio or elsewhere. Its use in a receiver is merely illustrative of one of its preferred uses.

It will be obvious to those skilled in the art that many modifications and alterations may be made to the illustrated structure without departing from the invention. Accordingly, it is intended that all such modifications and alterations be included within the spirit and scope of the invention as defined by the appended claims.

What is claimed is:

1. In a VIR correction system which processes a color signal composed of standard color bursts, video chrominance, a VIR color burst and a VIR chrominance reference to develop a phase error signal and an amplitude error signal, a phase and amplitude correction network for utilizing the error signals to selectively modify the color signal, comprising:
   a phase shifting network receiving the color signal at a vector angle A for providing a phase shifted color signal at a vector angle B;
   a phase control having a first input port receiving the color signal at vector angle A, having a second input port receiving the phase shifted color signal at vector angle B, and having a third input port receiving the phase error signal, said phase control being responsive to the state of the phase error signal for combining the color burst portions of the color signals at vector angles B and A-B so as to provide an uncorrected color burst output at vector angle A when the phase error signal indicates that no phase correction is desired, and to provide a corrected color burst output whose phase differs from vector angle A when the phase error signal indicates that phase correction is required;
   a gain control receiving the color signal and responsive to the amplitude error signal for operating on the VIR chrominance reference and the video chrominance portion of the color signal to develop a chrominance output signal whose amplitude is modified only when the amplitude error signal indicates that amplitude correction is required; and
   means for combining the chrominance output of said gain control and the color burst output of said phase control to provide a composite corrected color signal.

2. A correction network as set forth in claim 1 including means for enabling said phase control only during the color burst portions of the color signal and for enabling said gain control only during the VIR chrominance reference and video chrominance portions of the color signal.

3. A correction network as set forth in claim 1 wherein said phase control combines the color burst signals at vector angles B and A-B so as to develop a color burst output whose phase is variable over a range between vector angle B and vector angle A minus B.

4. A correction network as set forth in claim 3 wherein said phase control includes a first differential amplifier receiving the color signals at vector angles A and B for developing a first signal current whose phase is defined by the vector angle A minus B, a second differential amplifier receiving the color signal at vector angle B for developing a second signal current defined by the vector angle B, a load, and a current steering network responsive to variations in the phase error signal for steering variable portions of the first and second signal currents to the load, and means for disabling said first and second differential amplifiers except during the color burst portions of the color signal, whereby phase-corrected color bursts are developed across said load.

5. A correction network as set forth in claim 1 wherein said gain control includes a first differential amplifier receiving the color signal at vector angle A for developing a first current having an A.C. component of vector angle A and a given D.C. component, a second differential amplifier receiving a bias voltage for developing a second current substantially equal to said given D.C. component, a load, and a current steering network responsive to variations in the amplitude error signal for steering variable portions of the first and second currents to the load so as to hold the sum of the D.C. components applied to the load at a substantially constant value while varying the amplitude of the A.C. component, and means for disabling said first and second differential amplifiers except during the VIR chrominance reference and video chrominance portions of the color signaal, whereby amplitude-corrected chrominance is developed across said load.

6. In a VIR correction system which processes a color signal composed of standard color bursts, video chrominance, a VIR color burst and a VIR chrominance reference to develop a phase error signal and an amplitude error signal, a phase and amplitude correction network for utilizing the error signals to selectively modify the color signal, comprising:

a phase shifting network receiving the color signal at a vector angle A for providing a phase shifted color signal at a vector angle B;

a phase control including a first differential amplifier receiving the color signals at vector angles A and B for developing a first color burst signal current whose phase is defined by the vector angle A minus B, a second differential amplifier receiving the color signal at vector angle B for devoloping a second color burst signal current defined by the vector angle B, a load, and a current steering network responsive to variations in the phase error signal for steering variable portions of the first and second color burst signal currents to the load so as to provide, across said load, a corrected color burst output signal whose phase is variable over a range between vector angle B and vector angle A minus B; and a gain control having one differential amplifier receiving the color signal at vector angle A for developing a chrominance current having a given D.C. component and an A.C. component of vector angle A, another differential amplifier receiving a bias voltage for developing a D.C. current substantially equal to said D.C. component, and a current steering network responsive to variations in the amplitude error signal for steering variable proportions of the chrominance current and the D.C. current to said load so as to hold the sum of the D.C. components applied to the load at a substantially constant value while varying the amplitude of the A.C. component, whereby amplitude corrected chrominance and phase corrected color bursts are developed across said load.

* * * * *